US011899333B2

(12) United States Patent
Melikyan et al.

(10) Patent No.: US 11,899,333 B2
(45) Date of Patent: Feb. 13, 2024

(54) APPARATUS AND METHOD OF GENERATING MULTILEVEL QUADRATURE AMPLITUDE MODULATED SIGNAL USING ELECTRO-ABSORPTION MODULATORS

(71) Applicant: Nokia Solutions and Networks Oy, Espoo (FI)

(72) Inventors: Argishti Melikyan, Marlboro, NJ (US); Po Dong, Morganville, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 730 days.

(21) Appl. No.: 17/025,289

(22) Filed: Sep. 18, 2020

(65) Prior Publication Data

US 2021/0088870 A1  Mar. 25, 2021

Related U.S. Application Data

(60) Provisional application No. 62/902,876, filed on Sep. 19, 2019.

(51) Int. Cl.
  *G02F 1/225* (2006.01)
  *G02F 1/21* (2006.01)
(52) U.S. Cl.
  CPC .............. *G02F 1/225* (2013.01); *G02F 1/212* (2021.01)
(58) Field of Classification Search
  CPC ......... G02F 1/225; G02F 1/212; G02F 1/0121
  USPC ......................................................... 332/103
  See application file for complete search history.

(56) References Cited

U.S. PATENT DOCUMENTS

| 10,411,807 | B1 | 9/2019 | Earnshaw et al. |
| 2008/0074722 | A1 | 3/2008 | Kang |
| 2008/0231933 | A1 | 9/2008 | Doerr |
| 2009/0169148 | A1 | 7/2009 | Doerr et al. |
| 2010/0111466 | A1 | 5/2010 | Doerr et al. |
| 2011/0158577 | A1 | 6/2011 | Doerr |
| 2016/0261439 | A1 | 9/2016 | Menezo et al. |
| 2020/0099454 | A1* | 3/2020 | Talkhooncheh ........ G02F 1/015 |

OTHER PUBLICATIONS

De Valicourt, et al.; "Monolithic Integrated InP Transmitters Using Switching of Prefixed Optical Phases"; Journal of Lightwave Technology; https://www.researchgate.net/publication/271964480; Oct. 2014; 8 pgs.

Shin, et al.; "A novel BPSK Method using Multiple Quantum Well Electroabsorption Modulator integrated with MMI couplers"; IEEE; MWP99 Digest; 1999; 4 pgs.

Schrenk, et al.; "Flexible Optical QAM Generation with a Low-Complexity Amplified InP SOA/EAM-Based Modulator"; ECOC Technical Digest; 2012; 3 pgs.

(Continued)

*Primary Examiner* — Richard Tan

(57) ABSTRACT

An apparatus including an optical modulator and an electronic controller. The optical modulator includes a parallel-nested pair of MZIs, each arm of the MZIs including one or more EAMs therein. The electronic controller is electrically connected to drive the MZIs such that the optical modulator outputs an optical carrier modulated according to a quadrature amplitude modulation constellation with at least five different symbols.

30 Claims, 7 Drawing Sheets

(56) References Cited

OTHER PUBLICATIONS

Raybon, et al.; "180-GBaud All-ETDM Single-Carrier Polarization Multiplexed QPSK Transmission over 4480 km", Optical Fiber Communication Conference; 2018; 3 pgs.
Chen, et al.; "180-GBaud Nyquist Shaped Optical QPSK Generation Based on 240-GSa/s 100-GHz Analog Bandwidth DAC"; Asia Communications and Photonics Conference; 2016; 3 pgs.
Ogiso, et al.; "Ultra-High Bandwidth InP IQ Modulator for Beyond 100-GBd transmission"; Proc. Opt. Fiber Comm.; 2019; 3 pgs.
Dong, et al.; "112-GB/s monolithic PDM-QPSK modulator in silicon"; Opt. Express, Optical Society of America; vol. 20, No. 26; Dec. 10, 2012; 6 pgs.
Zhalehpour, et al.; "All-Silicon IQ Modulator for 100 GBaud 32QAM Transmissions"; Optical Fiber Communication Conference; 2019; 3 pgs.
Wolf, et al.; "Silicon-Organic Hybrid (SOH) Mach-Zehnder Modulators for 100 Gbit/s on-off Keying"; Scientific Reports; DOI: 10.1038/s41598-017-19061-8; Apr. 3, 2018; 13 pgs.
Melikyan, et al.; "Plasmonic-organic hybrid (POH) modulators for OOK and BPSK signaling at 40 Gbit/s"; Opt. Express; Optical Society of America; vol. 23, No. 8; DOI: 10.1364/OE 23.009938; 2015; 9 pgs.
Baeuerle, et al.; "120 GBd plasmonic Mach-Zehnder modulator with a novel differential electrode design operated at a beak-to-peak drive voltage of 178 mV"; Optics Express; vol. 27, No. 12; https://doi.org/10.1364.OE.27.016823; Jun. 10, 2019; 10 pgs.
Wang, et al.; "100-GHz Low Voltage Integrated Lithium Niobate Modulators"; Conference on Lasers and Electro-Optics; 2018; 2 pgs.
Doerr, et al.; "Monolithic InP 16-QAM Modulator"; Optical Fiber Communication; Optical Society of America; 2008; 3 pgs.
DeValicourt, et al.; "Monolithic Integrated InP Transmitters Using Switching of Prefixed Optical Phases"; Journal of Lightwave Technology; vol. 33, No. 3; Feb. 1, 2015; 7 pgs.
Tong, et al.; "Integrated germanium-on-silicon Franz-Keldysh vector modulator used with Kramers-Kronig receiver"; Optics Letters; vol. 43, No. 18; Sep. 15, 2018; 4 pgs.
Srinivasan, et al.; "56 GB/s Germanium Waveguide Electro-Absorption Modulator"; Journal of Lightwave Technology; vol. 34, No. 2; Jan. 15, 2016; 6 pgs.

\* cited by examiner

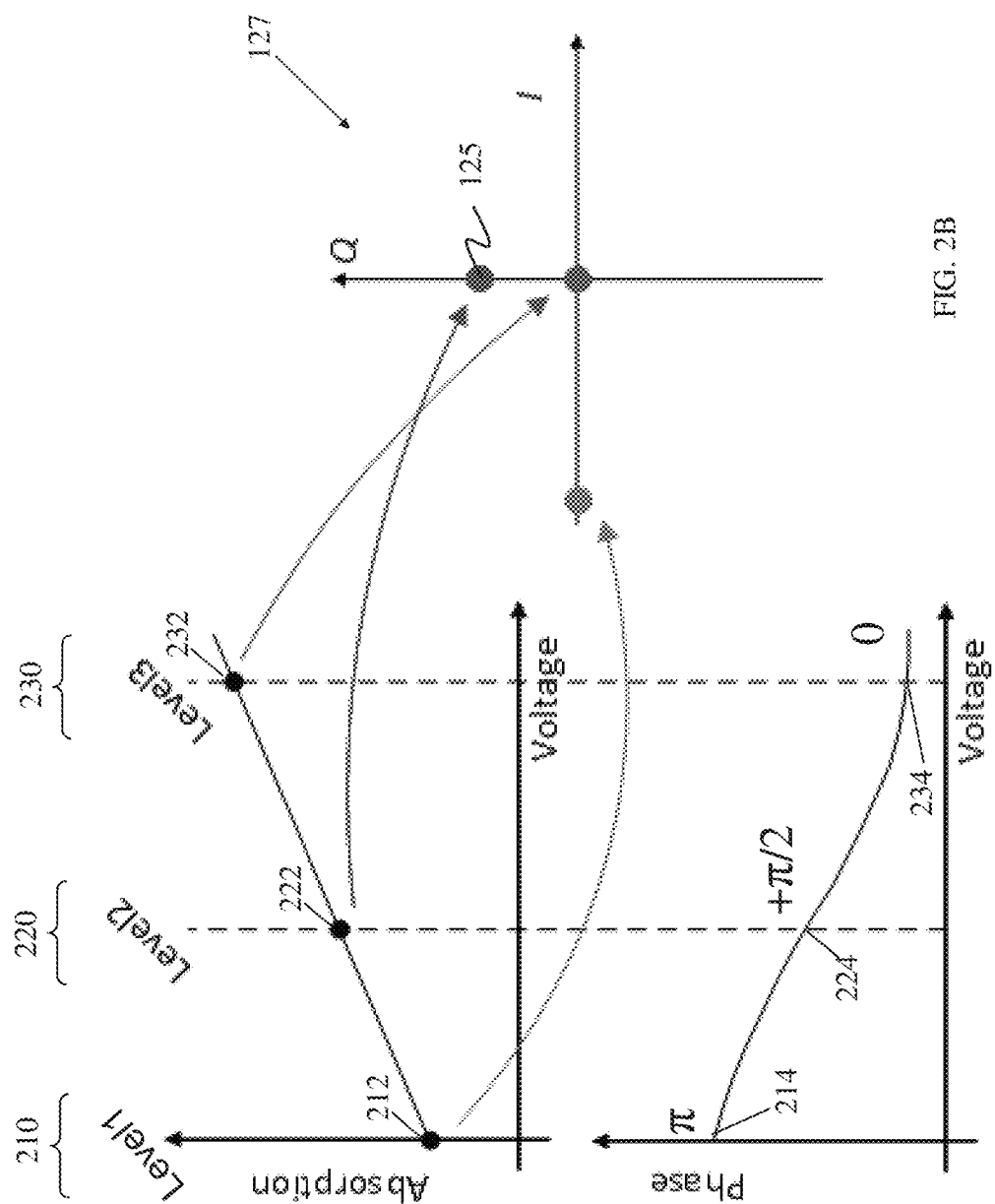

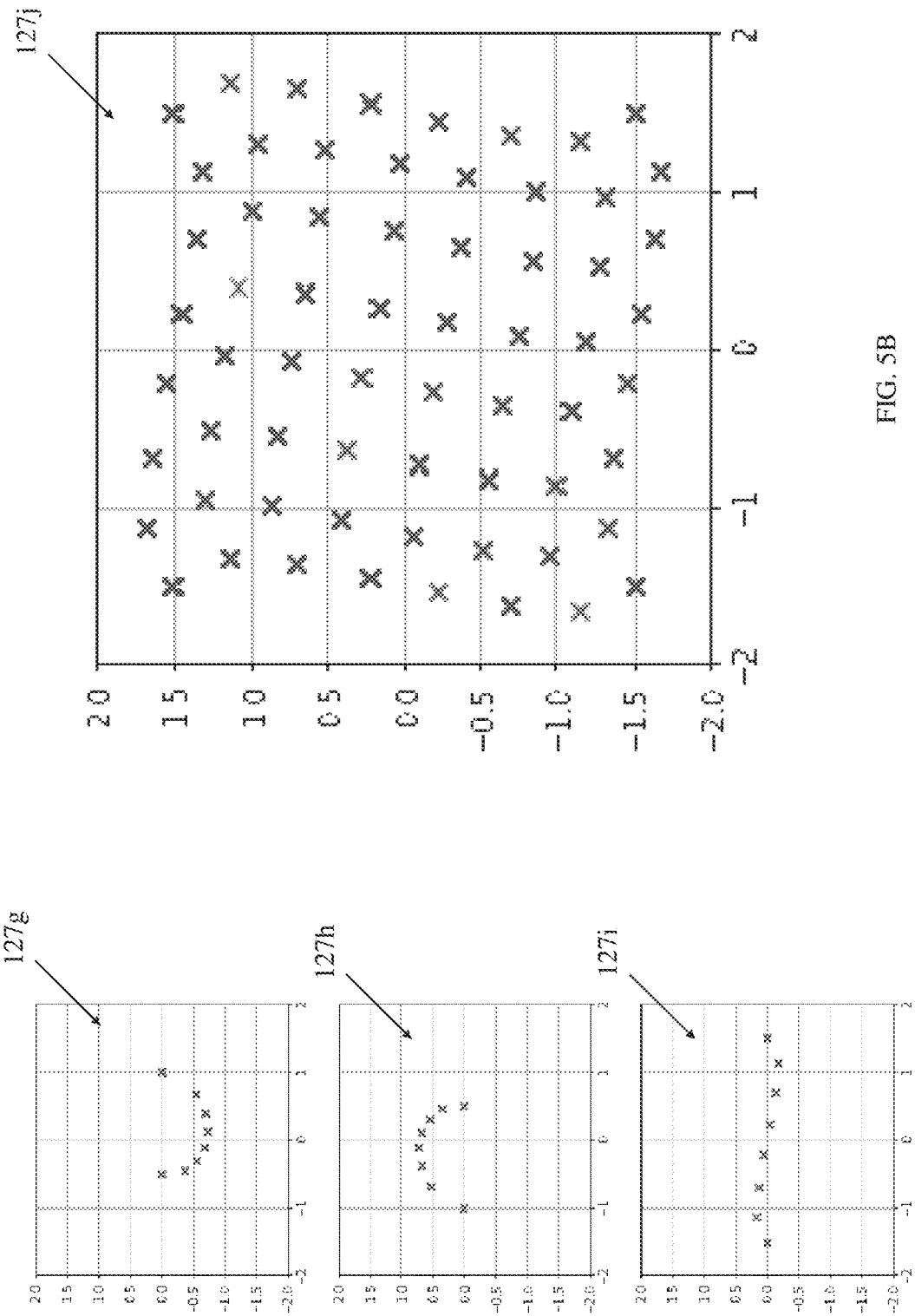

APPARATUS AND METHOD OF GENERATING MULTILEVEL QUADRATURE AMPLITUDE MODULATED SIGNAL USING ELECTRO-ABSORPTION MODULATORS

CROSS-REFERENCE TO RELATED APPLICATION

This application claims the benefit of U.S. Provisional Application Ser. No. 62/902,876, filed by Argishti Melikyan, et al. on Sep. 19, 2019, entitled "APPARATUS AND METHOD OF GENERATING MULTILEVEL QUADRATURE AMPLITUDE MODULATED SIGNAL USING ELECTRO-ABSORPTION MODULATORS," commonly assigned with this application and incorporated herein by reference in its entirety.

TECHNICAL FIELD

The invention relates, in general, to an apparatus including an optical modulator and electronic controller to generate multilevel quadrature amplitude modulated signals and methods of using such apparatus.

BACKGROUND

This section introduces aspects that may help facilitate a better understanding of the inventions. Accordingly, the statements of this section are to be read in this light and are not to be understood as admissions about what is prior art or what is not prior art.

Quadrature amplitude modulated (QAM) signals and coherent detection of the latter are currently used in metro and backbone systems to provide the high telecommunication data rates. The generation of the QAM signals requires the independent modulation of in-phase and the quadrature phase components of an optical carrier. Often modulation is achieved using Mach-Zehnder Interferometers (MZI) because of their linearity and low loss. However some MZI modulator, such as lithium niobate modulators, are bulky and/or may require high drive voltage swings (e.g., >6 peak to peak voltage, Vpp). More compact MZI silicon modulators rely on plasma effects in silicon, which may still require high drive voltages and can introduce optical losses in the modulator due to carrier associated optical absorption. Other optical modulators for on-off keying (OOK) and Dual-polarization quadrature phase shift keying (DP-QPSK) may have lower drive voltages and more compact size.

SUMMARY

While multi-level QAM constellations have been produced with some optical modulators, the optical modulators have often relied on more complex optical components and been more complex to manufacture and/or operate. Various embodiments herein provide optical modulators for QAM constellation(s) than can be based on simple optical components, e.g., 50/50 optical power splitters rather than complex power splitters with 3 or more optical outputs.

One embodiment includes an apparatus including an optical modulator and an electronic controller. The optical modulator includes a parallel-nested pair of MZIs, each arm of the MZIs including one or more EAMs therein. The electronic controller is electrically connected to drive the MZIs such that the optical modulator outputs an optical carrier modulated according to a quadrature amplitude modulation constellation with at least five different symbols.

In some embodiments, the electronic controller can be configured to drive each of the MZIs to modulate an optical carrier with one positive amplitude on a quadrature-phase component of the optical carrier and a different positive amplitude on an in-phase component of the optical carrier.

In some embodiments, the electronic controller can be configured to drive a first of the MZIs to modulate an optical carrier to have at least three different modulation amplitudes. In some such embodiments, the electronic controller can be configured to drive a second of the MZIs to modulate the optical carrier to have the at least three different modulation amplitudes.

In some embodiments, the electronic controller can be configured to drive the first of the MZIs to modulate the optical carrier to have at least three different modulation phases. In some such embodiments, the electronic controller can be configured to drive a second of the MZIs to modulate the optical carrier to have the at least three different modulation phases. In some such embodiments, at least two of the at least three different modulation phases can differ from each other by 90 degree phase increments. In some such embodiments, the electronic controller can be configured to drive a first of the MZIs to modulate an optical carrier to have three different modulation amplitudes.

In some embodiments, one of the arms of a first of the MZIs includes a first phase shifter and one of the arms of a second of the MZIs includes a second phase shifter. In some embodiments, each of the MZIs can be configured to combine portions of EAM modulated optical carriers from first and second arms thereof with a relative phase shift of 180 degrees±5 degrees.

In some embodiments, the optical modulator can be configured to combine modulated optical carriers from the two MZIs with a relative phase. In some such embodiments, the relative phase can have a magnitude of 90 degrees±5 degrees. In some embodiments, the electronic controller is electrically connected to: deliver a modulating drive voltage to a first of the EAMs of a first MZI of the nested pair such that an optical carrier passing through the first EAM to the first arm of the first MZI has one of two or more different non-null levels of optical phase and optical amplitude modulation, and, deliver a paired drive voltage to the second of the EAMs in the second arm of the first MZI of the nested pair such that the optical carrier passing through the second EAM to the second arm of the first MZI is reduced to a substantially null amplitude. In some such embodiments, the paired drive voltage to the second EAM of the first MZI can be a differentially complementary voltage of the modulating drive voltage to the first EAM of the first MZI. In some such embodiments, the electronic controller can be connected to: deliver a second modulating drive voltage to a first of the EAMs of a second MZI of the nested pair such that the optical carrier passing through the first EAM to the first arm of the second MZI has one of the three or more different levels of optical phase and optical amplitude modulation, and, deliver a second paired drive voltage to a second of the EAMs in the second arm of the second MZI of the nested pair such that the optical carrier passing through the second EAM to the second arm of the second MZI is reduced to substantially null amplitude. In some such embodiments, the paired drive voltage to the second EAM of the second MZI can be a differentially complementary voltage of the modulating drive voltage to the first EAM of the second MZI In some such embodiments, the electronic controller can be configured to deliver the modulating drive voltage, the paired drive voltage, the second modulating drive voltage and the second paired drive voltage over substantially a same time period. In some such embodiments, the first modulating drive voltage can include a first data stream and the second modulating drive voltage includes a second different data stream.

Any such embodiments can further include first optical couplers connected to ends of the arms of the nested pair and second optical couplers to connecting the first optical couplers on same ends of the arms to each other.

In any such embodiments, the optical modular and the electronic controller can be on a substrate as part of an electronic-photonic device.

Another embodiment includes an apparatus including an optical modulator and an electronic controller. The optical modulator includes a parallel-nested pair of MZIs, each arm of the MZIs including one or more EAMs therein. The electronic controller is electrically connected to drive the MZIs such that the nested pair outputs symbols of a quadrature amplitude modulation constellation with at least six of the symbols.

In some embodiments, the electronic controller can be configured to drive each of the MZIs to modulate an optical carrier with one positive amplitude on a quadrature-phase component of the optical carrier and a different positive amplitude on an in-phase component of the optical carrier.

In some embodiments, the electronic controller can be configured to drive a first of the MZIs to modulate an optical carrier to have at least three different modulation amplitudes. In some such embodiments, the electronic controller can be further configured to drive a second of the MZIs to modulate the optical carrier to have the at least three different modulation amplitudes.

In some embodiments, the electronic controller can be configured to drive the first of the MZIs to modulate the optical carrier to have at least three different modulation phases. In some such embodiments, the electronic controller can be further configured to drive a second of the MZIs to modulate the optical carrier to have the at least three different modulation phases. In some such embodiments, at least two of the at least three different modulation phases are different from each other by 90 degree phase increments. In some such embodiments, the electronic controller can be further configured to drive the first MZI to modulate an optical carrier to have at least three different modulation amplitudes.

In any such embodiments, one of the arms of a first of the MZIs can include a first phase shifter and one of the arms of a second of the MZIs can include a second phase shifter and in some such embodiments, the first and second phase shifters can be configured to apply a plus 180 or a minus 180 degree phase shift to an optical carrier passing through the one arm.

In any such embodiments, one of the nest pair can be optically connected to a waveguide including a third phase shifter along a waveguide segment thereof and in some such embodiments, the third phase shifter can be configured to apply a plus 90 or plus 45 or a minus 45 or a minus 90 degree phase shift to an optical carrier passing through the waveguide.

In any such embodiments, the electronic controller can be electrically connected to deliver a modulating drive voltage to a first of the EAMs of a first MZI of the nested pair such that an optical carrier passing through the first EAM to the first arm of the first MZI has one of three or more different levels of optical phase and optical amplitude modulation, and, deliver a paired drive voltage to the second of the EAMs in the second arm of the first MZI of the nested pair such that the optical carrier passing through the second EAM to the second arm of the first MZI is reduced to a substantially null amplitude. In some such embodiments, the paired drive voltage to the second EAM of the first MZI is a differentially complementary voltage of the modulating drive voltage to the first EAM of the first MZI In some such embodiments, a first one of the three different levels of the modulating drive voltage can generate a first lowest absorption and a first lowest phase change of the optical carrier, a second one of the three different levels of the modulating drive voltage can generate a second intermediate absorption and a second intermediate phase change of the optical carrier, and a third one of the three different levels of the modulating drive voltage can generate a third highest absorption and a third highest phase change of the optical carrier.

In some such embodiments, the electronic controller can be connected to deliver a second modulating drive voltage to a first of the EAMs of a second MZI of the nested pair such that the optical carrier passing through the first EAM to the first arm of the second MZI has one of the three or more different levels of optical phase and optical amplitude modulation, and, deliver a second paired drive voltage to a second of the EAMs in the second arm of the second MZI of the nested pair such that the optical carrier passing through the second EAM to the second arm of the second MZI is reduced to substantially null amplitude. In some such embodiments, the paired drive voltage to the second EAM of the second MZI is a differentially complementary voltage of the modulating drive voltage to the first EAM of the second MZI In some such embodiments, a first one of the three different levels of the second modulating drive voltage can generate a first lowest absorption and a first lowest phase change of the optical carrier, a second one of the three different levels of the second modulating drive voltage can generate a second intermediate absorption and a second intermediate phase change of the optical carrier, and a third one of the three different levels of the second modulating drive voltage can generate a third highest absorption and a third highest phase change of the optical carrier.

In some such embodiments, the electronic controller can be configured to deliver the modulating drive voltage, the paired drive voltage, the second modulating drive voltage and the second paired drive voltage over substantially a same time period. In any such embodiments, the first modulating drive voltage can include a first data stream and the second modulating drive voltage can include a second different data stream.

Any such embodiments can further including first optical couplers connected to ends of the arms of the nested pair and second optical couplers to connect the first optical couplers on same ends of the arms to each other.

In any such embodiments, the optical modular and the electronic controller can be on a substrate as part of an electronic-photonic device.

BRIEF DESCRIPTION

The embodiments of the disclosure are best understood from the following detailed description, when read with the accompanying FIGUREs. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which:

FIG. 1A presents a schematic diagram showing aspects of an example apparatus of the disclosure;

Figure 1A:
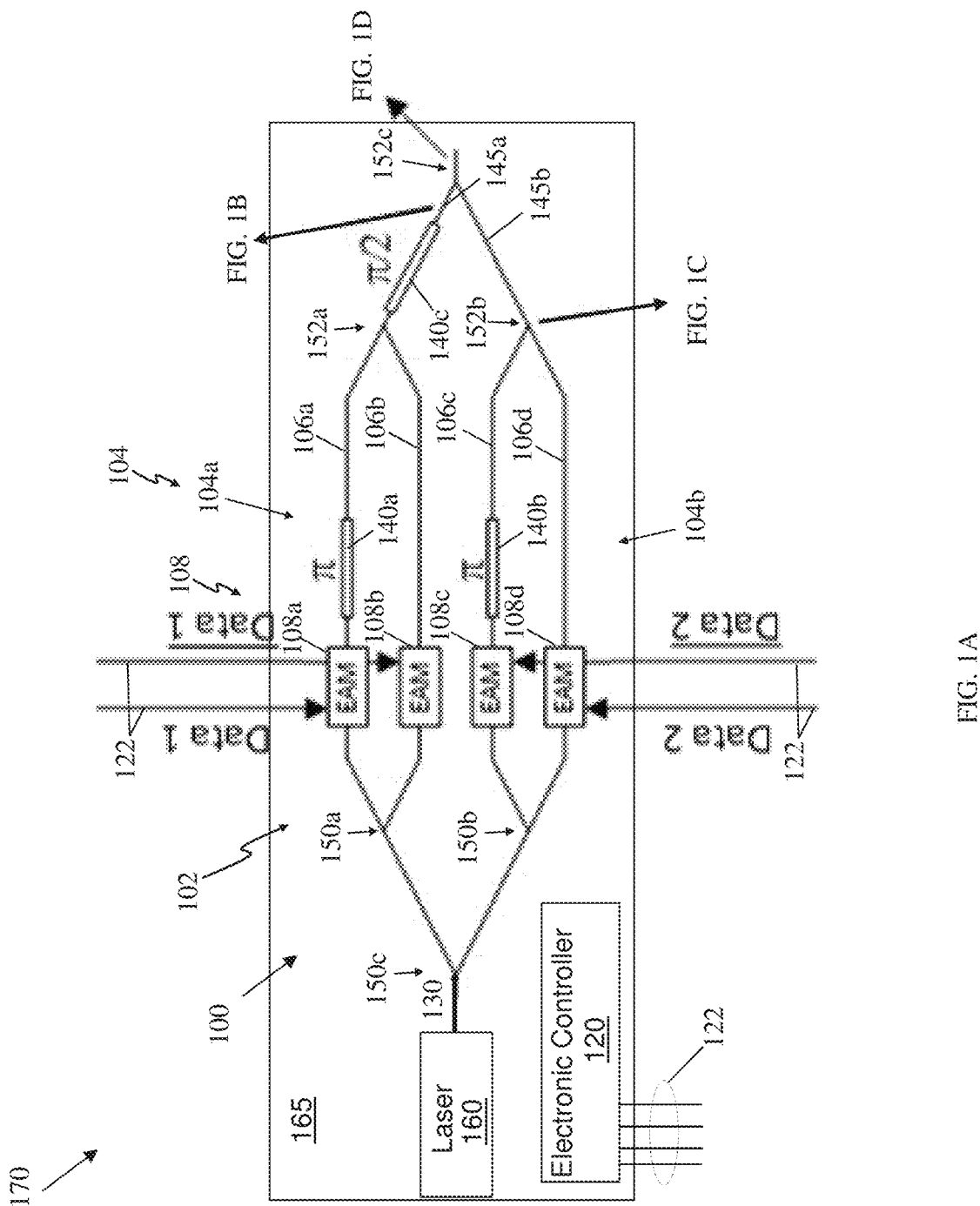
FIG. 1B shows an example 4-QAM constellation diagram that may be generated from a first MZI of an apparatus of the disclosure, such as the upper MZIs depicted in FIG. 1A.
FIG. 1C shows another example 4-QAM constellation diagram that may be generated from a second MZI of an apparatus of the disclosure, such as the lower MZI depicted in FIG. 1A.
FIG. 1D shows a 16 QAM constellation diagram produced from one way of operating an apparatus of the disclosure, such as the apparatus depicted in FIG. 1A when the upper and lower MZIs are operated to produce the constellations of FIG. 1B and FIG. 1C, respectively.
Figures 3A, 3B:
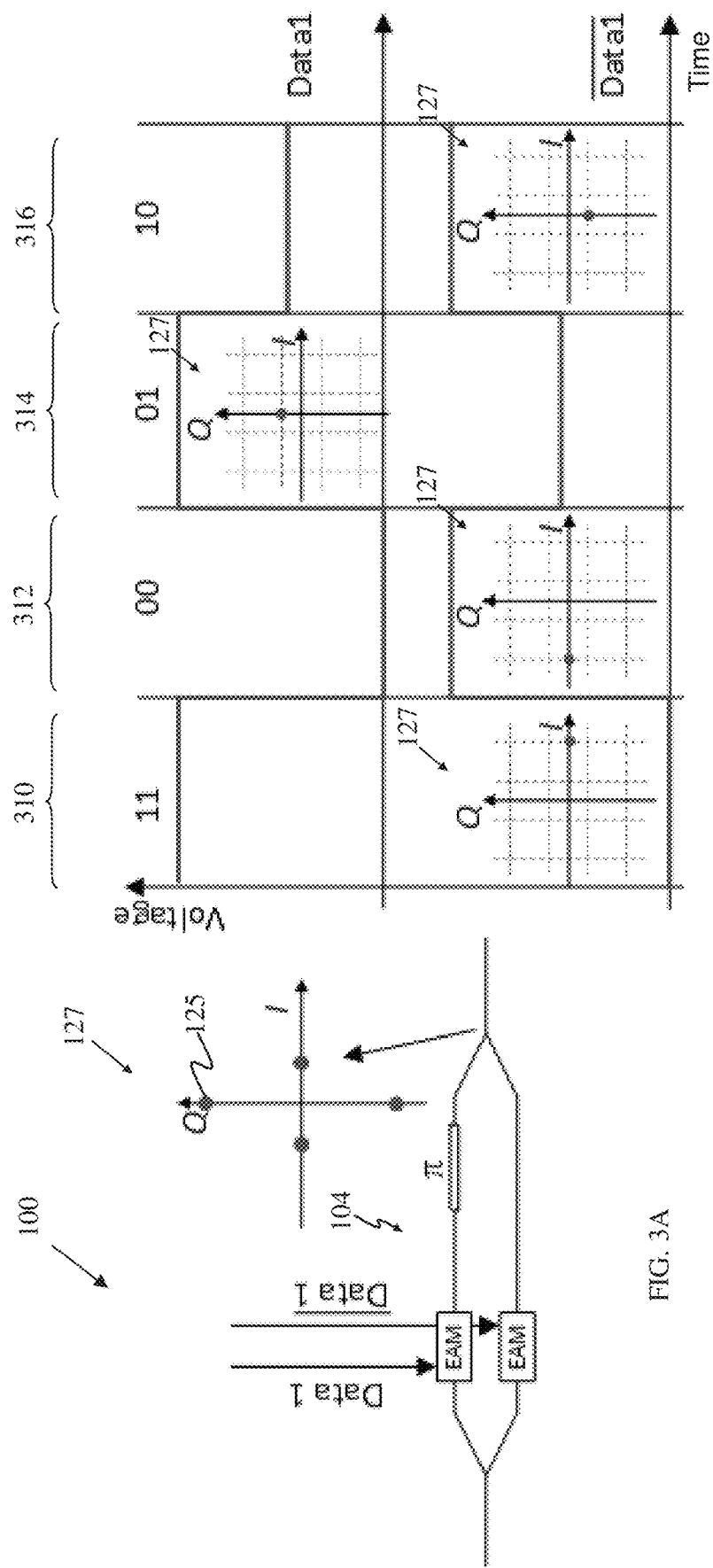
Figure 4A:
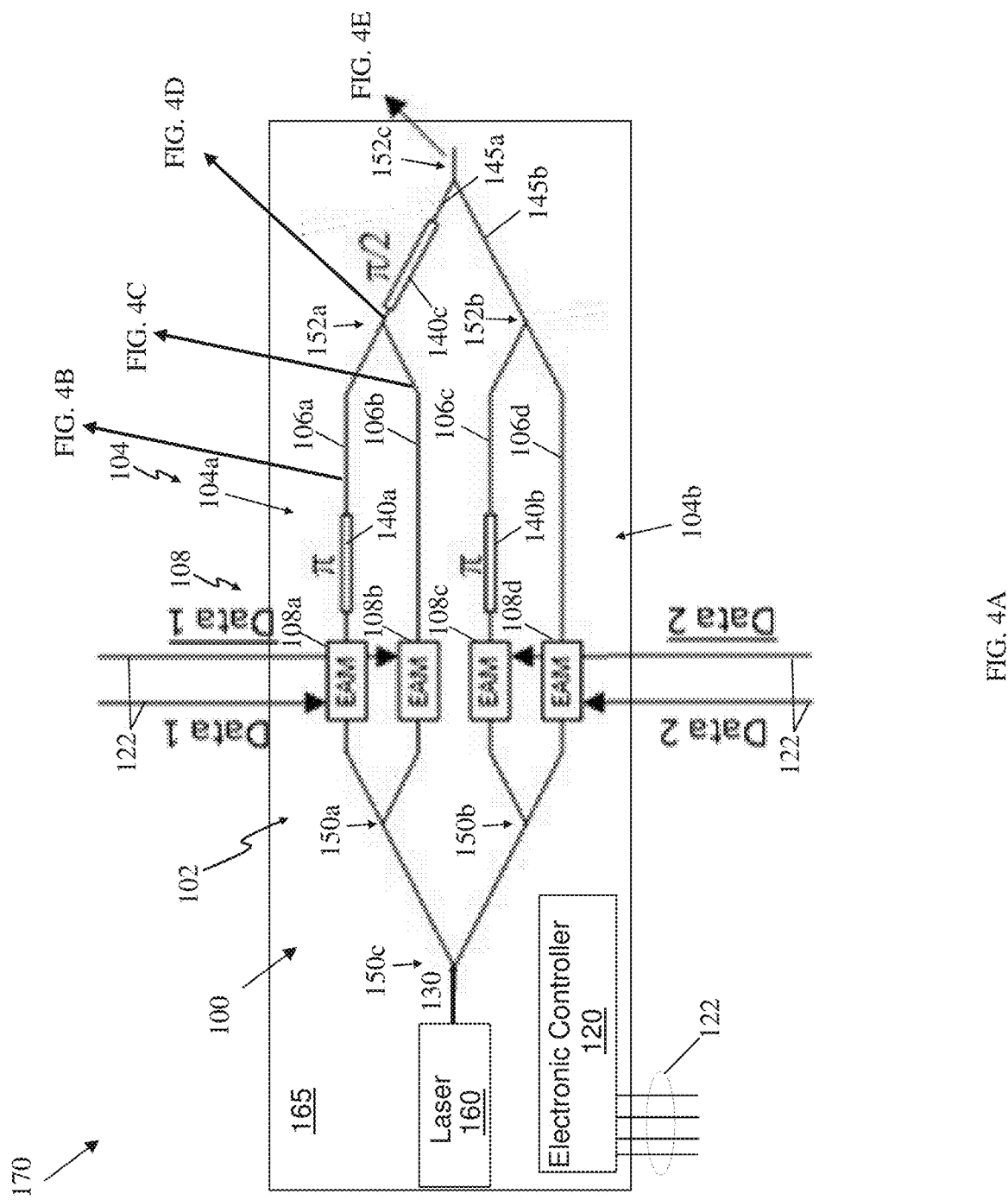
Figure 4E:
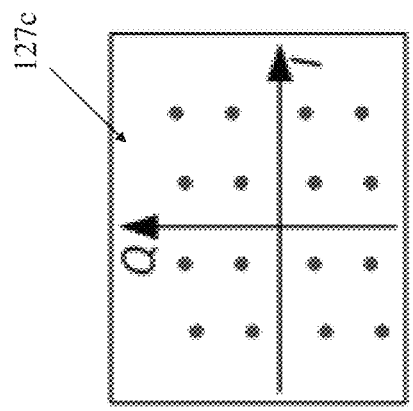
Figure 4D:
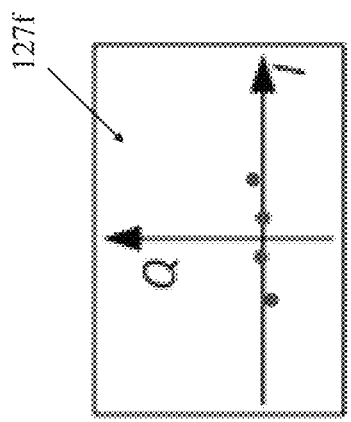
Figure 4C:
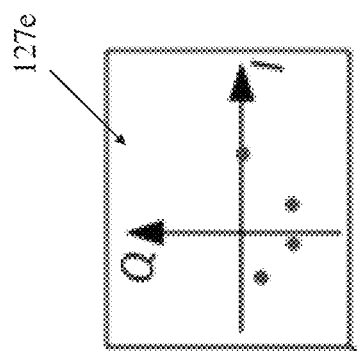
Figure 4B:
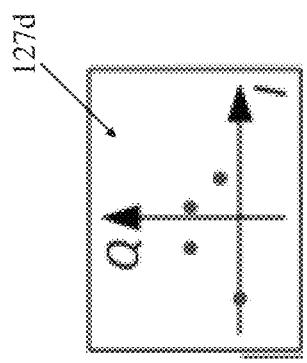

FIG. 2A presents example phase and amplitude modulations from an EAM of an apparatus of the disclosure, such as any of the EAMs depicted in FIG. 1A, in response to different of drive voltages sent from an electronic controller of the apparatus;

FIG. 2B shows example symbols of a constellation diagram generated by the EAM when operated to produce the modulations of FIG. 2A for three applied driving voltages;

FIG. 3A presents a MZI of the apparatus, e.g., the upper or lower MZI of FIG. 1A, and a 4-QAM constellation that may be generated by the MZI by suitably driving the EAMs therein with various voltages;

FIG. 3B schematically illustrates an example series of pairs of drive voltages for applied to the EAMs of the MZI of the FIG. 3A and example symbols of a QAM constellation diagram resulting from the paired drive voltages;

FIG. 4A presents a schematic diagram showing an example apparatus of the disclosure, similar to that shown in FIG. 1A;

FIG. 4B shows an example 4-QAM constellation diagram that may be generated by a first EAM of an upper MZI of the apparatus depicted in FIG. 4A;

FIG. 4C shows another example 4-QAM constellation diagram that may be generated by a second EAM of the upper MZI of the apparatus depicted in FIG. 4A;

FIG. 4D shows an example4-QAM constellation diagram that may be generated from combining the 4-QAM constellation diagrams from the first and second EAMs of the upper MZI of the apparatus depicted in FIG. 4A;

FIG. 4E shows a 16 QAM constellation diagram that may be generated from combining 4-QAM constellation diagrams by operating the upper and a lower MZIs of the apparatus depicted in FIG. 4A together;

FIG. 5A presents example 8-QAM constellations that may be produced the individual EAMs of the upper MZI of FIG. 4A and by the upper MZI itself when the EAMs therein product the signal outputs of the upper portions of FIG. 5A; and FIG. 5B presents an example 64-QAM constellation diagram may be generated by the optical modulator of FIG. 4A when the MZIs therein produce 8-QAM constellations such as depicted in FIG. 5A.

In the Figures and text, similar or like reference symbols indicate elements with similar or the same functions and/or structures.

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

The description and drawings merely illustrate the principles of the inventions. It will thus be appreciated that those skilled in the art will be able to devise various arrangements that, although not explicitly described or shown herein, embody the principles of the inventions and are included within their scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Embodiments of the invention benefit from our recognition that EAMs can be voltage driven to produce both optical phase and amplitude changes in optical carriers, which can be beneficially combined to produce the symbols of a higher order N-QAM modulation constellations (e.g., N>6 where N is an integer). We have found that by driving the EAMs in both arms of an MZI, at multiple intermediate voltages (e.g., greater than zero Volts but less than peak-to-peak maximum voltages), particular phase and amplitude modulated optical carriers can be generated and then, combined to produce an optical carrier modulated according to various N-QAM constellations, e.g., 8-QAM, 16-QAM or 64-QAM. That is, herein we often make use of both phase and amplitude response by individual EAMs to generate the sets of symbols of such N-QAM constellations.

This is in contrast to previous efforts using EAMs in MZIs to produce optical carriers modulated according to differential phase-shift keying (DPSK) or on-off keying (OOK) where the modulations of phases of optical signals are not used, or are suppressed, e.g., to produce "chirp-free" optical signals, in order to reduce or eliminate the phase changes that degrade transmission qualities of modulated light.

We believe some embodiments disclosed herein may facilitate generating higher order N-QAM constellations with lower voltage swings (e.g., drive voltages of about 2 Vpp), reduce the size of modulators (e.g., modulator footprints of about 40 μm×5 μm or less in some embodiments), improve energy efficiency and/or reduce optical losses (e.g., about 2.5 dB losses). Moreover, the same optical modulator configurations can facilitate generating a variety of N-QAM constellations without a need to increase the number of EAMs in the modulator or the complexity of the modulator's optical design.

One embodiment of the disclosure is an apparatus. FIG. 1A presents a schematic diagram showing aspects of an example apparatus 100 of the disclosure (e.g., an optical transmitter apparatus in some embodiments).

As illustrated, the apparatus 100 includes an optical modulator 102, itself having a parallel-nested pair 104 of MZIs (e.g., first and second MZIs 104a, 104b). Each arm (e.g., arms 106a, 106b, 106c, 106d) of the MZIs of the parallel-nested pair 104 includes one or more EAMs 108 (e.g., EAMs 108a, 108b, 108c, 108d) therein. The apparatus 100 also includes an electronic controller 120 (e.g., an ASIC in some embodiments) electrically connected to drive the MZIs (e.g., via electrical lines 122) such that the nested pair 104 outputs symbols of a quadrature amplitude modulation constellation with at least four of the symbols, e.g., 8-QAM, 16-QAM, or 64-QAM.

Figure 1B:
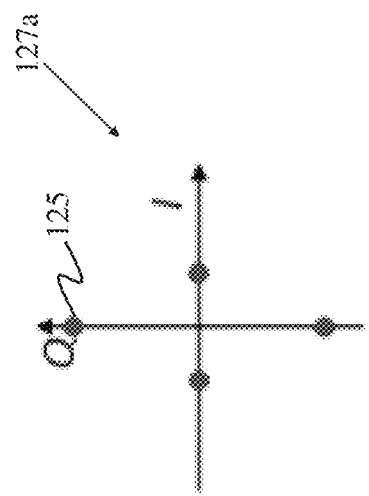
Figure 1C:
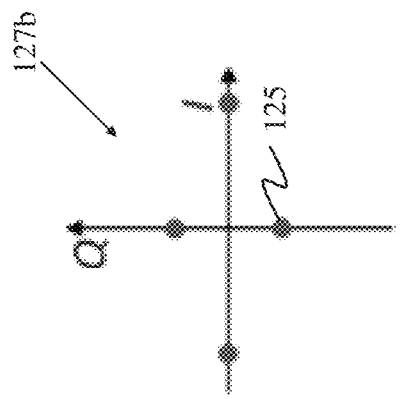
Figure 1D:
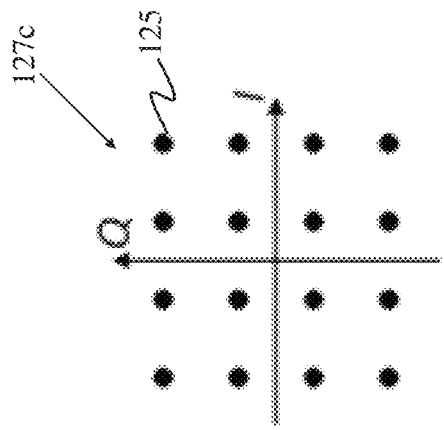

For instance, FIG. 1B shows example symbols (e.g., symbol 125) of a 4-QAM signal constellation diagram 127a modulated on an optical carrier at an output of the first MZI 104a after about a $\pi/2$ rotation by phase shifter 140c, and FIG. 1C shows another example 4-QAM constellation diagram 127b modulated on an optical carrier at optical output of the second MZI 104b. The symbols of the constellations 127a, 127b of FIGS. 1B and 1C are modulated onto an optical carrier in response to appropriately driving the MZIs 104a, 104b with voltage signals on the electrical lines 122. FIG. 1D shows a 16 QAM signal constellation diagram 127c whose symbols may be produced by appropriately combining optical carriers modulated according to the constellations diagrams 127a, 127b of FIGS. 1B and 1C, i.e., the symbols of the constellation may be modulated onto the optical carrier at the optical output of the optical modulator 102 in response to suitable driving voltages on the electrical lines 122. In FIGS. 1B-1D, I and Q axis represent the in-phase and quadrature components of an optical carrier (e.g., optical carrier 130 in FIG. 1A) respectively.

As seen in the constellation diagrams 127a, 127b of FIGS. 1B and 1A, some embodiments of the electronic controller 120 can be configured drive each of the MZIs 104a, 104b to modulate the optical carrier 130, passing through the MZI such that the optical carrier has one amplitude on a quadrature-phase component (Q) of the optical carrier and has a different amplitude on an in-phase component (I) of the optical carrier. For instance, electronic controller 120 may drive each of the EAMs 108a, 108b of a first of the MZIs 104a to modulate portions of an optical carrier 130 therefrom to have at least three different modulation amplitudes and drive each of the EAMs 108c, 108d of a second of the MZIs 104b to modulate the portions of the optical carrier 130 therefrom to have at least three different modulation amplitudes. For such embodiments, the EAMs 108a-108d may be operated, by the electronic controller 120, with drive voltages to produce the light absorption values 212, 222, and 232 as illustrated in FIG. 2A. That is, the electronic controller 120 can be configured to drive each of the EAMs 108a-108d to produce an optical modulation for the I, Q constellation of three signal values shown in FIG. 2B. From the EAMs 108a-108d, the output optical signals 125 modulated according to the constellation of FIG. 2B are added with possible phase rotations, as determined by phase shifters 104a, 104b, and/or 140c, in the optical signal output by the optical modulator 102.

In some such embodiments, at least two of the at least three different modulation phases can be different from each other by about 90 degree phase increments (e.g., about 0±5 degrees, 90±5 degrees, and 180±5 degrees). However in other embodiments, the at least three different modulation phases can differ from each other by different phase increments (e.g., about 45 degree increments or other relative phase increments).

As further illustrated in FIG. 1A, embodiments of the apparatus 100 can include a first phase shifter in one of the arms of a first of the MZIs 104a (e.g., phase shifter 140a in arm 106a) and a second phase shifter in one of the arms of a second of the MZIs 104b (e.g., phase shifter 140b in arm 106c). In some such embodiments, the first and second phase shifters (e.g., phase shifters 140a, 140b) can be configured to apply about a 180 phase shift to an optical carrier 130 passing through the one arm or arms (e.g., arms 106a and 106c, respectively), e.g., so that the mutually coherent light from the two arms is combined with such a relative phase shift (e.g., with an error of less than about 5 degrees) in the optical combiners of the MZIs (e.g., in optical combiners 152a and 152b). For example, the first and second phase shifters can be DC or low speed operable phase shifters and/or segments of passive optical waveguide configured to produce a fixed relative phase shift on the optical carrier passing through one of the arms with the EAM (e.g., the arms with the EAMs 108a and 108c).

As further illustrated in FIG. 1A, embodiments of the apparatus 100 can include a phase shifter, e.g., another DC or low speed operable phase shifter, optically in an optical path connected to an optical input or an optical output one of the nested pair (e.g., third phase shifter 140c in waveguide 145a connected to the optical output first MZI 104a). In some such embodiments, such a third phase shifter can be configured to apply about a plus 90, plus 45, a minus 45 or a minus 90 degree phase shift relative phase shift in the optical combiner 152c, between the modulated optical carrier 130 output by the waveguide 145a from the MZI 104a and the modulated optical carrier output by the other waveguide 145b from the other MZI 104b of the parallel nested pair. For example, the third phase shifter can be a DC phase shifter and/or segments of passive optical waveguide configured to apply a fixed, ±45 or ±90 degree relative phase shift to the optical carrier passing therethrough.

In some such embodiments, when the first and second phase shifters 140a, 140b are configured to apply relative ±180 degree phase shifts, the third phase shifter 140c is configured to apply a ±90 degree phase shift, wherein some of these phase shift values may have an error of about ±1 degree or even ±5 degrees in some embodiments.

The phase shifters enable modulating the different symbols of the QAM constellation of interest onto an optical carrier. For example the portion of the optical carrier 130 passing through the first of the nested pair 104a and the waveguide 145a with the third phase shifter 140c may be modulated to carry the symbols of the first 4-QAM symbol constellation diagram 127a shown in FIG. 1B and the portion of the optical carrier 130 passing through the second of the nested pair 104b and a waveguide with no phase shift (e.g., waveguide 145b with no phase shifter for producing a relative phase shift) may be modulated to carry the symbols of the second 4-QAM symbol constellation diagram 127b shown in FIG. 1C. One of ordinary skill would understand how the two portions of the optical carrier carrying symbols of such 4-QAM symbol constellations may be optically combined with a relative about 90 degree phase rotation to to form an optical carrier modulated according to the 16 QAM constellation 127c shown in FIG. 1E.

Based on the present disclosure one of ordinary skill would understand how the phase shifters and EAMs 108a-108d can be operated together in a nested pair of MZIs 104a-104b to modulate an optical carrier to carry the symbols of various target QAM constellations. For instance, while one EAM in one arm of one MZI of the nest pair can be configured to generate a multilevel phase and amplitude modulation (PAM) on the portion of optical carrier therein, the EAM in the second arm of the one MZI of the nested pair can be configured to remove the portion of the optical carrier therein, e.g., so that the output of the other arm is the modulated optical carrier from the MZI Each of the EAMs can be biased to provide the desired DC phase and amplitude response required to enable suitable combinations or superpositions of the modulated optical carriers from the various MZIs to produce an output optical signal carrying constellation symbols for a particular QAM constellation. The phase shifter (e.g., third phase shifter 140c set as a π/2 phase shifter) can phase shift the output from one MZI of the nested pair (e.g., MZI 104a) and EAMs may be biased for achieving null point operation of the nested MZI. A similar operation can be performed using one or both of the first and second phase shifters 140a, 140b of the nested pair to provide suitable combinations, i.e., superpositions, of modulated portions of the optical carriers from the two arms of the individual MZIs 104a-104b. As illustrated in FIGS. 2A-2B below, in some embodiments, for generating 16 QAM constellations, the electronic controller 120 can be configured to drive each individual EAM 108a-108d to modulate a portion of the optical carrier to output three different modulation amplitude-phase values, and the different output modulated portions of the optical carrier can be added with various relative phases to obtain the symbol values of a desired N-QAM constellation.

In some embodiments, the electronic controller 120 is electrically connected to deliver modulating drive voltages to the EAMs 108a-108d of the MZIs 104a-104b of the nested pair such that about equal intensity portions of the optical carrier passing through the individual EAMs 108a-108d are modulated to have the three in-phase (I) and quadrature-phase (Q) symbol values of FIG. 2B. As an example, the three (I, Q) symbol values can be (−2A, 0), (0, A), and (0, 0) where "A" is a constant.

FIG. 2A illustrates absorption and phase response curves of such examples of the EAMs 104a-104d of FIG. 1A to reverse bias voltages, e.g., applied by the controller 120 of FIG. 1A. The response curves have operating points corresponding to approximately to the 3 symbol values of the constellation illustrated in FIG. 2B. In particular, the (I, Q) symbol values (−2A, 0), (0, A), and (0, 0) of FIG. 2B may correspond to the respective (adsorption, phase) values (212, 214), (222, 224), and (232, 234) in FIG. 2A.

The (I, Q) symbol values of the constellation of FIG. 2B, i.e., the pairs (−2A, 0), (0, A), and (0, 0) become the pairs (2A, 0), (0, −A), and (0, 0) after a 180-degree phase rotation. Such a phase rotation may be performed to the optical signals output by the EAMs 108a and 108c by the respective optical phase shifters 140a and 140b. Thus, the upper and lower MZIs 104a, 104b can both output the (I, Q) symbol values (−2A, 0), (0, A), (0, −A), and (0, 2A) of the constellation 127b of FIG. 1C by appropriately driving the pairs of EAMs (108a, 108b) and (108c, 108d), thereof and combining light output by these individual pairs of EAMs. To illustrate, the pair of EAMs (108a, 108b) may be operated to output (I, Q) symbol pairs [(0, 0), (−2A, 0)], [(0, 0), (0, A)], [(0, A),(0, 0)], and [(2A, 0), (0, 0)] to thereby cause the upper MZI 104a of FIG. 1A to output the respective (I, Q) symbol values (−2A, 0), (0, A), (0, −A), and (0, 2A) of FIG. 1C. Here, the symbol pair [(Ib, Qb), (Ia, Qa)] means that EAM 108b outputs an (I, Q) symbol value (Ib,Qb), and EAM 108a outputs an (I, Q) symbol value (Ia, Qa). Similarly, EAMs 108d and 108c may be operated to output (I, Q) symbol pairs [(0, 0), (−2A, 0)], [(0, 0), (0, A)], [(0, −A),(0, 0)], and [(2A, 0), (0, 0)] to thereby cause the lower MZI 104b of FIG. 1A to output the respective (I, Q) symbol values (−2A, 0), (0, A), (0, −A), and (0, 2A) of FIG. 1C. Here, the symbol pair [(Id, Qd), (Ic, Qc)] means that EAM 108d outputs (I, Q) symbol value (Id,Qd), and EAM 108c outputs (I, Q) symbol value (Ic, Qc). Thus. operating the individual EAMs 108a-108d to output the symbols of FIG. 2B enables the upper and lower MZIs 104a and 104b of FIG. 1A to individually output optical carriers carrying each of the symbols of the 4-QAM constellation diagram 127b of FIG. 1C.

In producing a symbol of an N-QAM constellation, the modulating drive voltage (e.g., FIG. 1A, DATA 1) is applied to the first EAM 108a in the first arm 106a of the first MZI 104a while the paired drive voltage (e.g., FIG. 1A, $\overline{DATA1}$) is applied to the second EAM 108b in the second arm 106b of first MZI 104a. In producing a symbol of the N-QAM constellation, a drive voltage DATA2 is applied to the second EAM 108d in the second arm 106d of the second MZI 104b while a paired drive voltage $\overline{DATA2}$ is applied to the first EAM 108c in the first arm 106c of the second MZI 104b.

In some embodiments, the electronic controller 120 is electrically connected to deliver a modulating drive voltage to the EAMs of the first MZI of the nested pair such that an optical carrier passing through the EAMs to the arm of the first MZI (e.g., first EAM 108a in arm 106a of MZI 104a) has one of three or more different levels of optical phase and optical amplitude modulation, and, deliver a paired drive voltage to the EAMs of the second of the MZIs such that the optical carrier passing through the EAMs to the arm of the second MZI (e.g., second EAM 108b in arm 106b of MZI 104a) is reduced to a substantially null amplitude (e.g., a 90 percent or greater, or a 99 percent or greater reduction in optical power due to light absorption of the EAM 108b in the second arm 106b as compared to the optical power through EAM 108a in the first arm 106a). In some such embodiments, the paired drive voltage to the second EAM of the first MZI is a differentially complementary voltage of the modulating drive voltage to the first EAM of the first MZI (e.g., DATA1 is an opposite voltage to the voltage corresponding to DATA 1).

For example, at one stage in producing a symbol of the QAM constellation, the modulating drive voltage (e.g., FIG. 1A, $\overline{DATA1}$) can be applied to the first EAM 108a in the first arm 106a of the first MZI 104a while the paired drive voltage (e.g., FIG. 1A, DATA1) is applied to the second EAM 108b in the second arm 106b of first MZI 104a. For example, at another at another stage in producing another symbol of the N-QAM constellation, the paired drive voltage $\overline{DATA1}$can be applied to the first EAM 108a in the first arm 106a of the first MZI 104a while the modulating drive voltage DATA 1 is applied to the second EAM 108b in the second arm 106b of the first MZI 1041.

FIG. 2A presents example phase and amplitude modulation from an EAM of an apparatus 100 of the disclosure, such as any of the EAMs depicted in FIG. 1A, in response to three different levels of drive voltages sent from an electronic controller of the apparatus 100. FIG. 2B shows example symbols (e.g., symbol 125) of a constellation diagram 127 generated from the phase and amplitude modulations applied as depicted in FIG. 2A.

For instance, as illustrated in FIG. 2A, a first one (e.g., first level 210) of the three different levels of the modulating drive voltage can generate: a first lowest absorption (absorption level 212 to generate a highest optical amplitude) and first highest phase change (phase level 214, e.g., a 180° phase shift) of the optical carrier, a second one (e.g., second level 220) of the three different levels of the modulating drive voltage generates a second intermediate absorption (absorption level 222 to generate an intermediate optical amplitude) and second intermediate phase change (phase level 224, e.g., a +90° phase shift) of the optical carrier, and a third one (e.g., third level 230) of the three different levels of the modulating drive voltage generates a third highest absorption, i.e., about total attenuation (absorption level 232 to generate an lowest optical amplitude) and third highest phase change (phase level 234, e.g., a 0° phase shift) of the optical carrier.

As illustrated, an absorption increase is associated with the extra negative phases of −90° and −180° resulting in progressively lower optical amplitudes at the second and third levels 220, 230 as compared to the first level 210. As a non-limiting example, in some embodiments, the optical amplitudes at the first, second and third levels 210, 220, 230 may be reduced by about 1-3 dB or higher increments from one level to the next.

In some embodiments, the upper and/or lower optical modulator 104a, 104b of FIG. 1A and/or 4A may be operated to modulate portions of an optical carrier according to constellations having four points about aligned in the same axis (e.g., 4ASK modulation), e.g., as in the constellation 127f of FIG. 4D.

In some embodiments, the electronic controller 120 can be further connected to deliver a second modulating drive voltage (e.g., FIG. 1A, DATA 2) to an EAM of a second MZI of the nested pair of MZIs (e.g., EAM 108d of arm 106d of MZI 104b) such that an optical carrier passing through the EAM to an arm of the second MZI has one of the three or more different levels of optical phase and optical amplitude modulation, and, deliver a second paired drive voltage (e.g., FIG. 1A, $\overline{DATA2}$) to a second EAMs in another arm of the second MZI (e.g., EAM 108c of arm 106c of MZI 104b) such that an optical carrier passing through the second EAM to the other arm is reduced to substantially null amplitude. In some such embodiments, the paired drive voltage to the second EAM of the second MZI is a differentially complementary voltage of the modulating drive voltage to the first EAM of the second MZI (e.g., $\overline{DATA2}$ is an opposite voltage to the voltage corresponding to DATA 2).

Continuing with the same example, at the one stage in producing a symbol of the QAM constellation, the second modulating drive voltage (DATA 2) can be applied to the first EAM 108c in the first arm 106c of the second MZI 104b while the paired second drive voltage ($\overline{DATA2}$) is applied to the second EAM 108d in the second arm 106d of the second MZI 104b. And, at the other stage in producing another symbol of the N-QAM constellation, the paired drive voltage DATA 2 can be applied to the first EAM 108c in the first arm 106c of the second MZI 104b while the modulating drive voltage DATA 2 is applied to the second EAM 108d in the second arm 106d of the second MZI 104b.

Similarly, a first one (e.g., level 210) of the three different levels 210, 220, 230 of the second modulating drive voltage (DATA 2) can generate a first lowest absorption 212 and first highest phase change 214 of the optical carrier, a second one 220 of the three different levels of the second modulating drive voltage can generate a second intermediate absorption 222 and second intermediate phase change 224 of the optical carrier, and a third one 230 of the three different levels of the second modulating drive voltage can generate a third highest absorption 232 and second lowest phase change 236 of the optical carrier.

In various embodiments, the electronic controller 120 can be configured to deliver the modulating drive voltage DATA 1 (e.g., a first drive voltage), the paired drive voltage $\overline{DATA1}$ (e.g., a first paired voltage), the second modulating drive voltage DATA 2 and the second paired drive voltage $\overline{DATA2}$ over substantially a same time period (e.g., within 1 ns or less or 100 ps or less, or 10 ps or less at the stage or the other stage).

For example, FIG. 3A presents a MZI of the apparatus, such as the first MZI 104a with the first and second EAMs 108a, 108b as depicted in FIG. 1A. FIG. 3B presents an example series of paired drive voltages sent to the EAMs of the MZI depicted in FIG. 3A, and FIG. 3B presents a series of example paired drive voltages (e.g., DATA 1 and $\overline{DATA1}$), sent by the electronic controller 120 to the EAMs of an MZI of the apparatus, e.g., first and second EAMs 108a, 108b of the first MZI 104a as depicted in FIG. 1A, and example symbols (e.g., symbol 125) of a QAM symbol constellation 127 resulting from the paired drive voltages sent to the EAMS 108a, 108b so that the first or upper MZI 104a of FIG. 1A outputs the symbol values of the constellation 127a of FIG. 1B.

As shown in FIG. 3B, at a first stage of the series (stage 310), the paired drive voltages DATA 1, $\overline{DATA1}$ can be a low voltage level and a high drive voltage level, respectively applied to the first and second EAMs 108a, 108b, for substantially the same time period, to generate, e.g., a 11 symbol 125. At a second stage (stage 312), the paired drive voltages DATA 1, $\overline{DATA1}$ can be a high voltage level and a low drive voltage level applied to the first and second EAMs 108a, 108b, respectively, to generate, e.g., a 00 symbol 125. At a third stage (stage 314), the paired drive voltages DATA 1, $\overline{DATA1}$ can be a high voltage level and an intermediate drive voltage level applied to the first and second EAMs 108a, 108b, respectively, to generate, e.g., a 01 symbol 125. At a fourth stage (stage 316), the paired drive voltages DATA 1, $\overline{DATA1}$ can be an intermediate voltage level and a high drive voltage level applied to the first and second EAMs 108a, 108b, respectively, to generate, e.g., a 10 symbol 125. In this paragraph, the high and low voltage values are as shown in FIG. 2A, and resulting output symbol values from the EAMs 108a, 108b, i.e., for such voltage values, are as shown in FIG. 2B.

In other embodiment the stages 310-316, or other stages, of the series the paired drive voltages DATA 1, $\overline{DATA1}$ can be a low and a high drive voltage level, respectively applied to the first and second EAMs 108a, 108b, a high and a low drive voltage level, respectively applied to the first and second EAMs 108a, 108b, an intermediate and a high drive voltage level, respectively applied to the first and second EAMs 108a, 108b, and a high and an intermediate voltage level respectively applied to the first and second EAMs 108a, 108b. One skilled in the art would appreciate how other combinations of low, intermediate and high voltages could be applied to generate other symbols of a constellation.

Different paired drive voltages (e.g., DATA 2 and $\overline{DATA2}$), are simultaneously sent by the electronic controller 120 to the EAMs of an MZI of the apparatus, e.g., the first and second EAMs 108c, 108d of the second MZI 104b to generate other different symbols of a 4-QAM constellation 127b of FIG. 1C.

In any embodiments of the apparatus 100, the first modulating drive voltage, DATA 1, can include a first data stream, and, the second modulating drive voltage, DATA 2, can include a second different data stream (e.g., two different streams of stream of binary encoded information, wherein each stream has 2 bits each per symbol time slot). The first and second data streams can be modulated onto the optical carrier and included in the symbols of the QAM constellation output by the apparatus.

FIGS. 1A-1E illustrate the generation of an optical carrier modulated according to a 16-QAM constellation by using 3-levels of phase and amplitude modulation using two sets of independent pairs of drive voltage signals for encoding the portions of the optical carrier produced by the upper and lower MZIs 104a, 104b. That, each pair of drive signals is sued to modulate to separate bits onto the optical carrier per symbol time slot.

FIGS. 4A-4E illustrate the generation of an optical carrier modulated according to another 16-QAM constellation. FIG. 4A presents a schematic diagram showing aspects of an example apparatus 100 of the disclosure, similar to that shown in FIG. 1A. FIG. 4B shows an example 4-ASK based 4-QAM constellation diagram 127d generated from the first EAM 108a of the first or upper MZI 104a, and, FIG. 4C shows another example 4-ASK based 4-QAM constellation diagram 127e generated from the second EAM 108b of the first or upper MZI 104a. FIG. 4D shows another example of an approximate 4-ASK constellation diagram 127f generated from suitably combining optical carriers modulated according to the 4-QAM constellation diagrams 127d, 127e from the first and second EAMs 108a, 108b. FIG. 4E shows a 16 QAM constellation diagram 127c. An optical carrier having a 16 QAM modulation according to the constellation 127c may be generated by suitably combining optical carriers modulated according to the 4-QAM constellation 127f. For example, optical carriers modulated according to the constellation 127f by the upper and a lower MZI 104a, 104b may be combined with a relative phase shift of about 90 degrees.

Based on the present disclosure one skilled in the art would understand how other N-QAM constellations, e.g., for N=8, 16, 32, or 64, could be generated from different combinations of phase and/or amplitude modulation by applying drive voltages to the four EAMs 108a, 108b, 108c, 108d of the apparatus, e.g., without the need to add additional EAMs to the apparatus.

In some embodiments to generate 32- and higher N-QAM constellations it can be advantageous to apply more than three levels of drive voltages (e.g., four, five or more levels).

As another example, FIG. 5A presents example 8-QAM constellation 127i that may be formed by suitably combining portions of an optical carrier modulated to carry symbols of the constellations 127g and 127h (e.g., in some embodiments generated using 4 levels with 2 differential pairs of drive voltages, DATA 1, $\overline{DATA1}$ and DATA 2, $\overline{DATA2}$). Such optical carriers modulated according to the 8-QAM constellation of FIG. 5A may be combined with a suitable relative phase, e.g., about 90 degrees, to form an optical carrier modulated according to the 64-QAM constellation 127j of FIG. 5B. For example, optical carriers modulated according to the 8-QAM constellations 127g and 127h can be output from the first and second EAMs 108a, 108b of the first or upper MZI 104a, respectively, i.e., after relatively phase shifting the optical carrier output of one of the EAMs 108a,108b by about 180 degrees, and an optical carrier modulated according to the 8-QAM constellation 127i can be produced by combining the two optical carriers modulated according to the two constellations 127g and 127h. Based on this disclosure, one skilled in the art would understand how such output for the first MZI 104a could be combined with the output from the second MZI 104b to generate an optical carrier modulated according to the 64 QAM constellation127j.

Various N-QAM constellation can be obtained by driving I and Q nested MZIs with differential I and Q driving signals, and the shape of such constellations can be adjusted by adjusting the driving voltage swings, adjusting the modulator DC-bias, adjusting the EAM amplitude-phase modulation characteristics, adjusting the relative phases of the nested pair of MZIs and/or adjusting the driving voltage signal waveform.

Embodiments of the apparatus, such as shown in FIGS. 1A and 4A, further include first optical power couplers connected to ends of the arms of the nested pair of MZIs (e.g., optical power couplers 150a, 150b, 152a, 152b) and second optical power couplers connecting the first optical power couplers on same ends of the arms to each other (e.g., optical power couplers 150c, 152c). The optical coupler 152c enables the addition of the optical outputs from the nested-pair of MZIs 104a, 104b, e.g., with a relative phase shift due to the optical phase shifter 140c. The various optical couplers 150a, 150b, 152a, 152b, 150c, 152c may be, e.g., 1×2 optical splitters with equal splitting power at the 2 output ports, i.e., connected as 1×2 splitters or 2×1 combiners in the apparatus 100.

For instance, as illustrated in FIGS. 1A and 4A, the apparatus 100 can include a first 1:2 optical coupler 150a connected to one end of the arms 106a, 106b of the first MZI 104a and a first 2:1 optical coupler 152a connected to an opposite end of the arms 106a, 106b of the first MZI 104a, a second 1:2 optical coupler 150b connected to one end of the arms 106c, 106d of the second MZI 104b and a second 2:1 optical coupler 152b; connected to an opposite end of the arms of the second MZI 104b, a third 1:2 optical coupler 150c connected to the first and second 1;2 optical couplers 150a, 150b and a third 2:1 optical coupler 152c connected to the first and second 2:1 optical couplers 152a, 152b). Embodiments of the optical couplers can include more complex m×n optical couplers (m and n≥2) but where some of the ports of the optical couplers are not used.

Although the apparatus 100 in FIG. 1A is shown with the optical carrier being introduced to, and passing through, the apparatus from left to right, the opposite configuration with the optical carrier being introduced to, and passing through, the apparatus from right to left, is also within the scope of the disclosure.

The optical carrier 130 can be emitted from a laser 160 (e.g., in some embodiments, an external cavity semiconductor laser) which can be part of the apparatus 100 in some embodiments, while in other embodiments, is not part of the apparatus. The optical carrier can be in a range of wavelengths in the visible and/or infrared wavelength regions (e.g., from 400 to 2000 nm in various embodiments). including any wavelength communication channels of the common optical telecommunication wavelength bands, such as the Original (e.g., about 1260 to about 1360 nm), Extended (e.g., about 1360 to about 1460 nm), Short (e.g., about 1460 to about 1530 nm), Conventional (C-band, e.g., about 1530 to about 1565 nm), Long (from e.g., 1565 to about 1625 nm) or Ultralong (e.g., about 1625 to about 1675 nm) wavelength bands.

Non-limiting examples of the EAMs includes monolithic InP or other multi-layered semiconductor structure including group III-V semiconductor layers or silicon photonic.

In some embodiments, the optical modular 105 and the electronic controller 120 can be on a substrate 165 (e.g., a silicon, InP, GaAs, or silicon substrate) as part of an electronic-photonic device 170, e.g., photonic integrated circuit device configured as an optical transmitter device.

Those skilled in the art to which this application relates will appreciate that other and further additions, deletions, substitutions and modifications may be made to the described embodiments.

What is claimed is:

1. An apparatus, comprising:
an optical modulator including a parallel-nested pair of Mach-Zehnder Interferometers, each arm of the Mach-Zehnder Interferometers including one or more Electro-Absorption Modulators therein; and
an electronic controller electrically connected to drive the Mach-Zehnder Interferometers such that the optical modulator outputs an optical carrier modulated according to a quadrature amplitude modulation constellation with at least five different symbols, wherein the electronic controller is connected to apply intermediate voltages to drive each of the Mach-Zehnder Interferometers to modulate the optical carrier with one positive amplitude on a quadrature-phase component of the optical carrier and with a different positive amplitude on an in-phase component of the optical carrier.

2. The apparatus of claim 1, wherein one of the arms of a first of the Mach-Zehnder Interferometers includes a first phase shifter and one of the arms of a second of the Mach-Zehnder Interferometers includes a second phase shifter.

3. The apparatus of claim 1, wherein each of the Mach-Zehnder Interferometers is connected to combine portions of Electro-Absorption Modulator modulated optical carriers from first and second arms thereof with a relative phase shift of 180 degrees ±5 degrees.

4. The apparatus of claim 1, wherein the optical modulator is connected to combine modulated optical carriers from the two Mach-Zehnder Interferometers with a relative phase.

5. The apparatus of claim 4, wherein the relative phase has a magnitude of 90 degrees ±5 degrees.

6. The apparatus of claim 1, further including first optical couplers connected to ends of the arms of the parallel-nested pair and second optical couplers to connecting the first optical couplers on same ends of the arms to each other.

7. The apparatus of claim 1, wherein the optical modular and the electronic controller are on a substrate as part of an electronic-photonic device.

8. An apparatus, comprising:
an optical modulator including a parallel-nested pair of Mach-Zehnder Interferometers, each arm of the Mach-Zehnder Interferometers including one or more Electro-Absorption Modulators therein; and
an electronic controller electrically connected to drive the Mach-Zehnder Interferometers such that the optical modulator outputs an optical carrier modulated according to a quadrature amplitude modulation constellation with at least five different symbols; and
wherein the electronic controller is connected to apply intermediate voltages to drive a first of the Mach-Zehnder Interferometers to modulate the optical carrier to have at least three different modulation amplitudes.

9. The apparatus of claim 8 wherein, the electronic controller is connected to drive a second of the Mach-Zehnder Interferometers to modulate the optical carrier to have the at least three different modulation amplitudes.

10. The apparatus of claim 8, wherein one of the arms of the first of the Mach-Zehnder Interferometers includes a first phase shifter and one of the arms of a second of the Mach-Zehnder Interferometers includes a second phase shifter.

11. The apparatus of claim 8, wherein each of the Mach-Zehnder Interferometers is connected to combine portions of Electro-Absorption Modulator modulated optical carriers from first and second arms thereof with a relative phase shift of 180 degrees ±5 degrees.

12. The apparatus of claim 8, wherein the optical modulator is connected to combine modulated optical carriers from the two Mach-Zehnder Interferometers with a relative phase.

13. The apparatus of claim 12, wherein the relative phase has a magnitude of 90 degrees ±5 degrees.

14. The apparatus of claim 8, wherein the optical modular and the electronic controller are on a substrate as part of an electronic-photonic device.

15. An apparatus, comprising:
an optical modulator including a parallel-nested pair of Mach-Zehnder Interferometers, each arm of the Mach-Zehnder Interferometers including one or more Electro-Absorption Modulators therein; and
an electronic controller electrically connected to drive the Mach-Zehnder Interferometers such that the optical modulator outputs an optical carrier modulated according to a quadrature amplitude modulation constellation with at least five different symbols; and
wherein the electronic controller is connected to apply intermediate voltages to drive a first of the Mach-Zehnder Interferometers to modulate the optical carrier to have at least three different modulation phases.

16. The apparatus of claim 15 wherein, the electronic controller is connected to drive a second of the Mach-Zehnder Interferometers to modulate the optical carrier to have the at least three different modulation phases.

17. The apparatus of claim 15, wherein at least two of the at least three different modulation phases differ from each other by 90 degree phase increments.

18. The apparatus of claim 15, wherein the electronic controller is connected to drive the first of the Mach-Zehnder Interferometers to modulate the optical carrier to have three different modulation amplitudes.

19. The apparatus of claim 15, wherein one of the arms of the first of the Mach-Zehnder Interferometers includes a first phase shifter and one of the arms of a second of the Mach-Zehnder Interferometers includes a second phase shifter.

20. The apparatus of claim 15, wherein each of the Mach-Zehnder Interferometers is connected to combine portions of Electro-Absorption Modulator modulated optical carriers from first and second arms thereof with a relative phase shift of 180 degrees ±5 degrees.

21. The apparatus of claim 15, wherein the optical modulator is connected to combine modulated optical carriers from the two Mach-Zehnder Interferometers with a relative phase.

22. The apparatus of claim 21, wherein the relative phase has a magnitude of 90 degrees ±5 degrees.

23. The apparatus of claim 15, wherein the optical modular and the electronic controller are on a substrate as part of an electronic-photonic device.

24. An apparatus, comprising:
an optical modulator including a parallel-nested pair of Mach-Zehnder Interferometers, each arm of the Mach-Zehnder Interferometers including one or more Electro-Absorption Modulators therein;
an electronic controller electrically connected to drive the Mach-Zehnder Interferometers such that the optical modulator outputs an optical carrier modulated according to a quadrature amplitude modulation constellation with at least five different symbols; and
wherein the electronic controller is electrically connected to:
deliver a modulating drive voltage to a first of the Electro-Absorption Modulators in a first arm of a first Mach- Zehnder Interferometer of the parallel-nested pair such that an optical carrier passing through the first Electro-Absorption Modulator of the first Mach-Zehnder Interferometer has one of two or more different non-null levels of optical phase and optical amplitude modulation, and deliver a paired drive voltage to a second of the Electro-Absorption Modulators in a second arm of the first Mach-Zehnder Interferometer of the parallel-nested pair such that the optical carrier passing through the second Electro-Absorption Modulator of the first Mach-Zehnder Interferometer is reduced to a substantially null amplitude.

25. The apparatus of claim 24, wherein the paired drive voltage delivered to the second Electro-Absorption Modulator of the first Mach-Zehnder Interferometer is a differentially complementary voltage of the modulating drive voltage delivered to the first Electro-Absorption Modulator of the first Mach-Zehnder Interferometer.

26. The apparatus of claim 24, wherein, the electronic controller is connected to:

deliver a second modulating drive voltage to the first of the Electro-Absorption Modulators of a second Mach-Zehnder Interferometer of the parallel-nested pair such that the optical carrier passing through the first Electro-Absorption Modulator to the first arm of the second Mach-Zehnder Interferometer has one of the three or more different levels of optical phase and optical amplitude modulation, and, deliver a second paired drive voltage to the second of the Electro-Absorption Modulators in the second arm of the second Mach-Zehnder Interferometer of the parallel-nested pair such that the optical carrier passing through the second Electro-Absorption Modulator to the second arm of the second Mach-Zehnder Interferometer is reduced to substantially null amplitude.

27. The apparatus of claim 26, wherein the paired drive voltage to the second Electro-Absorption Modulator of the second Mach-Zehnder Interferometer is a differentially complementary voltage of the modulating drive voltage to the first Electro-Absorption Modulator of the second Mach-Zehnder Interferometer.

28. The apparatus of claim 26, wherein the electronic controller is configured to deliver the modulating drive voltage, the paired drive voltage, the second modulating drive voltage and the second paired drive voltage over substantially a same time period.

29. The apparatus of claim 26, wherein the modulating drive voltage includes a first data stream and the second modulating drive voltage includes a second different data stream.

30. The apparatus of claim 24, wherein the optical modular and the electronic controller are on a substrate as part of an electronic-photonic device.

* * * * *